United States Patent
Hjelmstrom et al.

(10) Patent No.: US 9,438,814 B2
(45) Date of Patent: Sep. 6, 2016

(54) METHOD, LENS ASSEMBLY AND CAMERA FOR REDUCING STRAY LIGHT

(71) Applicant: Axis AB, Lund (SE)

(72) Inventors: Jonas Hjelmstrom, Staffanstorp (SE); Anders Johannesson, Hollviken (SE)

(73) Assignee: AXIS AB, Lund (SE)

( * ) Notice: Subject to any disclaimer, the term of this patent is extended or adjusted under 35 U.S.C. 154(b) by 128 days.

(21) Appl. No.: 14/260,860

(22) Filed: Apr. 24, 2014

(65) Prior Publication Data
US 2014/0320686 A1    Oct. 30, 2014

(30) Foreign Application Priority Data
Apr. 25, 2013    (EP) .................................... 13165327

(51) Int. Cl.
H04N 5/235    (2006.01)
H04N 5/238    (2006.01)

(52) U.S. Cl.
CPC ............ *H04N 5/2355* (2013.01); *H04N 5/238* (2013.01); *H04N 5/2351* (2013.01); *H04N 5/2356* (2013.01)

(58) Field of Classification Search
CPC ............ H04N 5/2355; H04N 5/2351; H04N 5/2356; H04N 5/238
See application file for complete search history.

(56) References Cited

U.S. PATENT DOCUMENTS

| | | | |
|---|---|---|---|
| 2003/0169345 A1* | 9/2003 | Rykowski | H04N 5/217 348/207.99 |
| 2005/0052551 A1 | 3/2005 | Tsunoda | |
| 2007/0024721 A1 | 2/2007 | Rogers | |
| 2008/0002959 A1 | 1/2008 | Border et al. | |
| 2009/0015682 A1 | 1/2009 | Chretien | |
| 2009/0273843 A1* | 11/2009 | Raskar | G02B 27/0018 359/601 |
| 2013/0083312 A1 | 4/2013 | Baraniuk et al. | |
| 2014/0313350 A1* | 10/2014 | Keelan | H04N 9/045 348/188 |

FOREIGN PATENT DOCUMENTS

JP    9-214827    8/1997

OTHER PUBLICATIONS

Extended Search Report mailed Aug. 2, 2013, in European Patent Application No. 13165327.1.

* cited by examiner

*Primary Examiner* — Luong T Nguyen
(74) *Attorney, Agent, or Firm* — Oblon, McClelland, Maier & Neustadt, L.L.P

(57) ABSTRACT

The present invention relates to a method (300) for reducing stray light in an output image of a scene, said method comprising; providing (301) a camera (100) comprising a lens assembly (102, 202), providing (302) an aperture unit (103, 203) having an aperture gate (204a, 204b) in an aperture plane being orthogonal to an optical axis (OA) of said lens assembly (102, 202), said aperture gate (204a, 204b) being adjustable in said aperture plane, acquiring (303), by means of said camera (100), a plurality of images of said scene, wherein each image of said plurality of images is acquired using an unique aperture gate setting, wherein each of said unique aperture gate settings correspond to a unique combination of a position and a shape of said aperture gate (204a, 204b) in said aperture plane, analyzing (305) said plurality of images for generating data pertaining to a difference in stray light content with respect to said plurality of images, and producing (306) said output image based on said data pertaining to said difference in stray light content.

9 Claims, 5 Drawing Sheets

METHOD, LENS ASSEMBLY AND CAMERA FOR REDUCING STRAY LIGHT

TECHNICAL FIELD

The present invention generally relates to a method for reducing stray light in an output image of a scene. The invention also relates to a lens assembly for reducing stray light and a camera having such a lens assembly and a processing unit arranged to perform the method. Further, the invention also relates to a system comprising a camera and a processing unit arranged to perform the method. The camera of the system comprises a lens assembly for reducing stray light. Furthermore, the invention also relates to a use of the camera and the system.

BACKGROUND ART

Cameras are used in a large variety of applications in order to capture and record still pictures and video streams. In order to capture or record an image or a video stream, light originating from the scene to be captured is collected using some form of lens system of the camera in question. The light originating from the scene is then focused by means of the lens system and the focused light is directed onto an image sensor, which in turn records the incident light originating from the scene. The image sensor is generally built up of several pixels. When the light from the scene as focused by the lens system reaches the image sensor and is focused onto the same, image data can be recorded for each pixel of the image sensor, resulting in a pixel level. It is important that the incident light is focused when reaching the sensor in order to be able to acquire a sharp and not blurry image. The pixel level as recorded for each of the pixels is then in turn used to represent the scene being captured by the camera.

Generally a camera is employed with some form of aperture or iris to control the amount of light and its characteristics entering the camera housing and consecutively reaching the image sensor of the camera in question. The ability to be able to control the amount of light reaching the sensor is generally essential, as too much light reaching the sensor results in an over exposed image carrying less information of the scene being captured. Correspondingly it is also important to be able to collect as much light as possible when recording a dark scene. Also the depth of field is affected by the aperture setting.

Conventionally the size of the aperture, and consequently the amount and the characteristics of the light reaching the image sensor, is controlled by means of an iris often referred to as a conventional iris. The conventional iris or iris diaphragm is conventionally made of number of thin metal plates which are mounted in a circular manner next to each other to form a relatively circular centered aperture. The size of the aperture can be adjusted by changing the relative angles of the metal plates. When changing the relative angles, the size of the aperture is changed although the circular shape and its central location is in principle kept constant.

When using a conventional iris or aperture, of the type described above, when capturing an image, certain light conditions may result in that unwanted light is recorded by the image sensor of the camera. The unwanted light will result in an image having a lower image quality. A particular form of unwanted light is referred to as stray light or parasitic rays. By stray light is generally meant light or light components not belonging to an image of a scene but that rather has been added to the image in question, added in the widest possible sense. In practice the stray light may originate from the scene or may not originate from the scene. In certain conditions the negative effects of stray light are significant. For instance when a lens assembly having a conventional iris is used under strong lighting conditions, the negative effects from the stray light become clearly disturbing. Just to give a few examples, the sun or another strong light source may lead to ghost images of the light source in question. The ghost images which can significantly reduce the image quality of the acquired image are representations of the aperture.

Further the edges of the metal plates of the iris may lead to diffraction resulting in an image having a lower image quality.

Another phenomenon leading to that stray light is reaching the image sensor is internal reflections in the optical components of the lens assembly or the camera used. When a surface of an optical component exhibits a defect, light may be directed into the glass of the optical component and then be transferred within the component to a different location. This will result in that small defects in e.g. a lens may lead to that stray light is reaching the image sensor which in turn results in an image having a lower image quality.

Hence, there is a need for an improved method and lens assembly for reducing stray light when acquiring images or video streams.

SUMMARY OF THE INVENTION

According to an aspect of the invention, the above is at least partly alleviated by a method for reducing stray light in an output image of a scene, said method comprising; providing a camera comprising a lens assembly, providing an aperture unit having an aperture gate in an aperture plane being orthogonal to an optical axis of said lens assembly, said aperture gate being adjustable in said aperture plane, acquiring, by means of said camera, a plurality of images of said scene, wherein each image of said plurality of images is acquired using an unique aperture gate setting, wherein each of said unique aperture gate settings correspond to a unique combination of a position and a shape of said aperture gate in said aperture plane, analyzing said plurality of images for generating data pertaining to a difference in stray light content with respect to said plurality of images, and producing said output image based on said data pertaining to said difference in stray light content.

By means of the invention it is possible to reduce the amount of stray light in an output image of a scene, that is, to reduce the stray light content in the output image. According to the invention, the output image is produced based on data pertaining to a difference in stray light content. The wording output image is to be construed as any image being outputted from any type of camera, digital or analog. The output image may, as will be apparent, be based on image data from a single or several acquired images and may also have been subjected to various processes aiming at improving the image quality or alter the image characteristics in another way, also the output image may be an image comprised in a video stream. In other words, the output image may be any data, e.g. compressed or modulated, which represent an image of a scene.

By stray light is meant any light or light component which is added to an image of a scene that is not belonging to the image of the scene that is being recorded or captured. The stray light may originate from within the scene or may originate from out of the scene. In other words, the stray light may very well originate from e.g. a light source within the scene, but may also e.g. originate from a light source not part of the scene being captured. In any event the stray light is light added to an image of the scene that does not belong to the image of the scene. The wording stray light content is to be interpreted broadly as including a pixel level as well as light characteristics of the stray light being added to an image. More specifically the stray light content of an image is light added to the image resulting in an increased pixel level of the affected pixels of the image. It should be noted that the stray light added to the image in question and resulting in an increased pixel level do generally have a lower spatial frequency compared to noise which is commonly also added to acquired images. In other words, the stray light generally affects larger areas of the acquired image in contrast to noise which generally affects small areas on a random basis.

Further, stray light is additive in contrast to being multiplicative. This results in that the stray light content of an image may be distinguished from other effects having a multiplicative effect. For instance, unwanted features of a camera system may result in undesired changes of the pixel levels in the image being captured. These effects, which for instance may result from a non-homogenous lens are typically affecting the pixel levels as a scaling, i.e. the pixel levels concerned are multiplied by a scaling factor. This is not the case with stray light which is additive.

The wording scene is to be interpret broadly and may consequently represent anything being recorded or photographed such as, a person, a car, a house etc., but it may also be an area of the ground, a part of a wall, a part of a territory etc.

By camera is meant any device being capable of acquiring and outputting image data pertaining to a scene being recorded or captured. The camera may be analog or digital and may output data in any form as long as the outputted data represents an output image, as discussed above.

It should be noted that within the context of this application, that the term lens assembly is to be interpret widely and thus covers any optical components or component used to focus light originating from a scene onto an image sensor or similar component of a camera. Consequently the lens assembly may be a very sophisticated zoom lens comprising numerous of optical elements such as lenses and mirrors. The lens assembly may also e.g. be a single simple lens used to focus light onto an image sensor.

It should be noted that within the context of this application the term aperture unit may be any type of unit or arrangement comprising an aperture gate used to control the amount and characteristics of light from e.g. a scene reaching an image sensor of a camera.

The wording aperture gate is to be construed as any opening or arrangement that may be used to control the amount and characteristics of the light reaching an image sensor of a camera. To give a few non-limiting examples, the aperture gate may be an opening through which light may pass, it may also be a transparent or semitransparent portion of an otherwise light blocking or opaque element, or it may also be a reflective element or portion or the like used to direct light directly or indirectly onto an image sensor of a camera. In fact the aperture gate may comprise several isolated regions jointly controlling the amount and characteristics of the light reaching an image sensor of a camera. In other words, the aperture gate may comprise several isolated openings, transparent or semitransparent portions or reflecting portions. The aperture gate may also comprise a combination of various elements used to control the light, that is, the aperture gate may e.g. be a combination of openings and transparent portions or reflective portions.

The wording aperture plane is to be construed as to mean a plane orthogonal to the optical axis of the lens assembly comprising a point, on the optical axis, in which point chief rays from off axis objects in the scene to be recorded or captured crosses the optical axis of the lens assembly. By positioning the aperture gate in the aperture plane, all rays originating from an object in the scene will be used irrespective of the aperture gate setting. In other words, image information from all points of an object in the scene may be acquired although various aperture gate settings are used.

The present invention is based on the realization that by acquiring a plurality of images using different aperture gate settings, an enhanced output image with a reduced stray light content may be produced. This may, according to the invention, be achieved by acquiring a plurality of images using different aperture gate settings, where the different settings corresponds to unique combinations of positions and shapes of the aperture gate in the aperture plane.

It should be noted that within the context of this application the term position may mean any position of the aperture gate within the aperture plane. By also alternating the shape in addition to the position of the aperture gate when acquiring the different images, the amount and characteristics of the light reaching an image sensor of a camera may be further controlled. By controlling the shape of the aperture gate the light entering the camera through the lens assembly may be controlled in sophisticated manner using additional possibilities to influence the light actually reaching an image sensor of a camera. It is for example possible to alter the shape of the aperture gate based on the scene being recorded or captured. By altering the shape of the aperture gate based on the scene, images having a lower stray light content may be acquired. This will in turn result in that it is possible to produce an output image having a reduced stray light content. It should be noted that within the context of this application the term shape may mean any physical form of the aperture gate.

It should be noted that any number of images may be acquired and used without departing from the scope of the invention.

By analyzing the acquired images, data pertaining to a difference in stray light content of the different images may be generated. The generated data pertaining to the difference in stray light content may then be used to select an image or images or parts of images, or to create an improved aperture gate setting subsequently used to produce an output image having a reduced stray light content. When analyzing the acquired images in order to generate data pertaining to the difference in stray light content, several different strategies may be employed, as will be described more in detail hereinafter.

For instance, each of the acquired images may be divided into a plurality of corresponding pixel groups of neighboring pixels. The size of the pixel groups may vary depending on the needs and in particular vary depending on the nature of the stray light content being added to the images in question. In other words the size of the pixel groups may generally be increased if the stray light content of the images are of a low spatial frequency and hence affecting a large area. The pixel groups may for instance comprise a single pixel, 2×2, 5×5, 10×10, 50×50 pixels or similar. A mean value of the pixel levels of the pixel groups may then be calculated. The mean value of the pixel levels of each corresponding pixel group may then be used to produce the data pertaining to a difference in stray light content. The data pertaining to a difference in stay light content may in this exemplified case be represented by a matrix where each row of the matrix represents the calculated mean values for each corresponding pixel group. Conversely, each column may be representing the calculated mean values for each corresponding pixel group. The data may as is apparent also be represented as a vector or in any other suitable form. Further, the data may be a vector where each element represents a pixel group of an image having the lowest pixel level and is thus assumed to have the lowest stray light content. In other words the data pertaining to a difference in stray light content may simply indicate for each pixel group, which image is assumed to have the lowest stray light content.

A similar strategy may be to determine the pixel levels for all pixels in a every image, and then analyze the pixel levels for all pixels within an image, in order to determine a mean value for the pixel levels of all pixels within that certain image. The data pertaining to a difference in stray light content may then be represented by calculated mean values for all acquired images. In other words, an overall level for each acquired image is determined. In this particular case, the data pertaining to a difference in stray light content may be represented by vector having a single value for each acquired image.

Generally, the image having the lowest mean pixel level or light intensity mean value is the image having the lowest stray light content of the acquired images.

In the following another strategy that may be used to generate the data pertaining to a difference in stray light content will be described. After having divided the acquired images into a plurality of corresponding pixel groups of neighboring pixels as described above, a contrast value may then calculated for each pixel group. It is to be noted that each pixel group must in this particular case comprise at least two pixels, as no contrast value can be defined and hence calculated for a single isolated pixel. The contrast value of each corresponding pixel group may then be used to produce the data pertaining to a difference in stray light content. The data pertaining to a difference in stay light content may in this exemplified case be represented by a matrix where each row of the matrix represents the calculated contrast values for each corresponding pixel group. Conversely, each column may be representing the calculated contrast values for each corresponding pixel group. The data may as is apparent also be represented as a vector or in any other suitable form. Further, the data may be a vector where each element represents a pixel group of an image having the highest contrast value and is thus assumed to have the lowest stray light content. In other words the data pertaining to a difference in stray light content may also in this case simply indicate for each pixel group, which image is assumed to have the lowest stray light content.

Consequently, the data pertaining to a difference in stray light content may be represented in several different ways. The actual representation of the data is not important as long as the data comprises information pertaining to a difference in stray light content. In fact, the data pertaining to a difference in stray light may be any data form which a difference in stray light content may be concluded. By difference is simply meant that the data is indicative of a relative or absolute difference in stray light content. In other words, the wording difference may simply imply a classification according to stray light content.

When producing the output image based on the data pertaining to the difference in stray light content, several different strategies may be employed, as will be discussed more in detail hereinafter. In fact, the actual way used for producing the output image may be based on the generated data pertaining to the difference in stray light content as will be described more in detail hereinafter.

According to a preferred embodiment, the analyzing may further comprise dividing each of said plurality of images into corresponding pixel groups, calculating a mean pixel level for pixels comprised in each pixel group of each of said plurality of images, generating said data pertaining to a difference in stray light content based on said calculated mean pixel level for each group of each of said plurality of images. By dividing the acquired images into corresponding pixel groups and calculating a mean pixel level for each pixel group of each of said plurality of images, the data pertaining to a difference in stray light content may be generated in an efficient manner and represented in various ways as exemplified above. A pixel group having the lowest average pixel level may generally be interpreted as the pixel group with the lowest estimated stray light content.

According to a preferred embodiment, the analyzing may further comprise dividing each of said plurality of images into corresponding pixel groups, calculating a contrast value for pixels comprised in each pixel group of each of said plurality of images, generating said data pertaining to a difference in stray light content based on said calculated contrast value for each group of each of said plurality of images. By dividing the acquired images into corresponding pixel groups and calculating a contrast value for each pixel group of each of said plurality of images, the data pertaining to a difference in stray light content may be generated in an efficient manner and represented in various ways as exemplified above. By calculating a contrast value influences from scaling of the pixel levels from e.g. a non-homogenous lens may be counteracted. This is due to the fact that a ratio which remains the same irrespective of scaling effects is calculated when calculating the contrast value. A pixel group having a higher contrast may generally be interpreted as a pixel group having a lower stray light content.

According to an embodiment of the invention, said producing may further comprise, creating a merged aperture gate setting based on said data pertaining to said difference in stray light content, by combining at least two of said unique aperture gate settings used in said acquiring, and using said merged aperture gate setting to acquire an additional image, and using said additional image as said output image. By acquiring a plurality of images and consecutively creating a merged aperture gate setting based on the data pertaining to a difference in stray light content, it is possible to acquire an improved image having a reduced stray light content. The improved image may then advantageously be used as an output image.

According to an embodiment of the invention, said producing may further comprise, selecting one of said plurality of images based on said data pertaining to said difference in stray light content, and using said selected image as said output image. This is advantageous in that no new output image has to be produced as one of the acquired images may be used as output image. In practice an image having a low stray light content or the image having the lowest stray light may be selected based on the data pertaining to a difference in stray light content. It is of course possible to select any image of the acquired images as output image, based on the data pertaining to a difference in stray light content. Generally, the image with the overall lowest level or highest contrast will be the most stray light free image among the acquired images. Irrespective of the representation of the data pertaining to a difference in stray light content, an image assumed to have a low or the lowest stray light content may be selected based on the data.

According to an embodiment of the invention, said producing may further comprise, determining a first part of a first image of said plurality of images and second part of a second image of said plurality of images based on said data pertaining to said difference in stray light content, and stitching said determined first part and said determined second part to form at least a part of a combined image, and using said combined image as said output image.

By determining parts of the acquired images having a lower stray light content than corresponding parts of the remaining images, a combined image having a reduced stray light content may be produced. In practice the acquired images may be analyzed to find parts of the images having a low stray light content for a certain part of the complete image.

The parts may be predetermined or based on the data pertaining to a difference in stray light content. A simple way is to use the above pixel groups as parts and simply select one of each corresponding pixel groups found to have the lowest stray light content. Another strategy that may be used is to based on the data pertaining to a difference in stray light content determine parts comprising one or several pixel groups. The size and shape of each part may be varied and hence adapted to suit the needs. The skilled person realizes that several ways of determining the parts may be used. In practice it is preferred to use corresponding parts of all acquired images and to select one part from one of the acquired images to be used in the output image based on the data pertaining to a difference in stray light content.

The parts, as determined from the acquired images, having a low or the lowest stray light content may then be stitched together to produce an output image which may consequently be completely or partly comprised of parts from a plurality of images. On the other hand it may in certain cases be determined that a specific image corresponding to a specific aperture gate setting may have a lower stray light content in the complete image as compared to the other acquired images. In this case the complete image having the lower stray light content may be used as output image according to above.

According to an embodiment of the invention, said producing may further comprise selecting a first part and a second part of said output image to be produced, said first part and said second part comprising at least one pixel group, selecting a first subset of images of said plurality of images to be used for producing said first part based on said data pertaining to said difference in stray light content, selecting a second subset of images of said plurality of images to be used for producing said second part based on said data pertaining to said difference in stray light content, producing said first part by using corresponding parts of said images of said first subset, and determining a mean pixel level for each pixel in said first part and using said determined mean pixel level as an output value for each corresponding pixel of said first part, producing said second part by using corresponding parts of said images of said second subset, and determining a mean pixel level for each pixel in said second part and using said determined mean pixel level as an output value for each corresponding pixel of said second part, and stitching said produced first part and said produced second part to form a composite image comprising said produced parts, and using said composite image as said output image.

By determining a first part and a second part of an output image to be produced, and selecting a first subset and a second subset based on said data pertaining to said difference in stray light content, one or several images may be selected to be used when producing a specific part of said output image. Several strategies may be used to select subsets being suitable for producing the respective parts of the output image. By analyzing the data pertaining to the difference in stray light, e.g. images having a low level of stray light in a specific part may be identified and consequently selected. By selecting images from the plurality of images having a relatively speaking low level of stray light, for a specific part of the images, a part having a relatively speaking low stray light content may be produced. When producing parts of said output image a pixel level for each pixel in said selected images in said corresponding parts may be determined. By determining a mean value of said pixel levels and using the mean value as an output value, the signal to noise ratio, SNR, for each pixel may be improved. Consequently by selecting an appropriate subset of images for a specific part and determining a mean pixel level for each corresponding pixel within said corresponding parts, the SNR may be improved. Then by stitching improved parts together to form a composite output image, the output image may be further improved in that the stray light content is reduced and at the same time the SNR of the output image is improved.

When selecting images for the respective subsets for the respective parts, based on the data pertaining to a difference in stray light content, several strategies may be used. For instance, as discussed above, the pixel level for each pixel in the acquired images may be determined. A mean pixel level within the corresponding groups may then be determined. Based on the mean pixel level, images may then be selected for the respective subsets. For instance, a threshold value may be used, and the images having a mean pixel level for the group in question which is below a certain threshold may then be selected for the subset in question.

Another strategy, may be to conduct statistical analysis of the pixel levels for each corresponding part of the acquired images. For instance, the images found to have pixel levels within the lowermost quartile may be selected for the subset in question, based on the data pertaining to a difference in stray light content. Another strategy is to select a specific number of images having the lowest level of stray light content for the subset in question, based on the data pertaining to a difference in stray light content.

The mean value of the pixel levels for each corresponding pixels in the selected subset of images may consequently be used to improve signal-to-noise ratio, SNR.

According to another aspect of the invention, there is provided a method for identifying stray light in an image of a scene using a camera comprising an image sensor, and a lens assembly comprising a lens for focusing light onto the image sensor, an aperture unit having an aperture gate arranged in an aperture plane, said aperture gate having a position, a shape and/or a size being adjustable in said aperture plane by means of said aperture unit, said method comprising: acquiring, by means of said camera, a plurality of images of said scene, wherein each image of said plurality of images is acquired using a, within said plurality of images, unique aperture gate setting, wherein each of said unique aperture gate settings corresponds to a unique combination of a position, a shape and/or a size of said aperture gate in said aperture plane, dividing each of said plurality of images into corresponding pixel groups, calculating a mean pixel level or a contrast value for pixels comprised in said corresponding pixel groups of each of said plurality of images, and comparing said calculated mean pixel levels or contrast values for identifying stray light in said plurality of images. By means of the invention it is possible to identify stray light in an image of a scene such that conclusions regarding stray light present in the image may be drawn. In general, features of this aspect of the invention provide similar advantages as discussed above in relation to the previous aspect of the invention.

According to another aspect of the invention, there is provided a lens assembly for reducing stray light, said lens assembly comprising, an aperture unit having an aperture gate arranged in an aperture plane being orthogonal to an optical axis of said lens assembly, said aperture gate having a position and a shape being adjustable in said aperture plane. In general, features of this aspect of the invention provide similar advantages as discussed above in relation to the previous aspect of the invention.

According to one embodiment of the invention, a size of said aperture gate of said aperture unit may adapted to be adjusted, which is advantageous in that the amount of light e.g. reaching a sensor of a camera through the lens assembly may be controlled by controlling the size of the aperture gate.

According to an embodiment of the invention, said aperture plane may be a fixed plane along said optical axis.

According to another embodiment of the invention, said aperture unit may comprise a rotating disk having a first gate and a second gate corresponding to different positions and/or shapes of said aperture gate in said aperture plane, which is advantageous in that different aperture gate settings may be realized in a mechanically simple but yet reliable manner. The rotating disk may thus be rotated in such a way that different gates are rotated into a position where a specific gate is used to control the amount and characteristics of the light reaching e.g. the detector of a camera. Additionally, the rotating disk may be so designed that a size of the aperture gate may additionally be controlled. In order to realize this a rotating disk having a plurality of aperture gates, corresponding to different positions, shapes and/or sizes may be used.

According to an embodiment of the invention, said aperture unit may comprise a liquid crystal element adapted to transmit or block light in a first position in said aperture plane and in a second position in said aperture plane corresponding to different positions and shapes of said aperture gate in said aperture plane. By comprising a liquid crystal element in the aperture gate, the aperture gate may be realized in a way where both the shape, position and the size of the aperture gate may easily be altered, as the pixels of the liquid crystal element is activated or deactivated in order to make the pixels light blocking or semitransparent. When the pixels are not activated or vice versa the liquid crystal element may be transparent. Depending on the resolution of the liquid crystal element the position, shape and size of the aperture gate may be controlled in a more or less exact manner, which means that by utilizing a liquid crystal element having a high resolution, the characteristics of the aperture gate may be accurately controlled.

According to an embodiment of the invention, said aperture unit may comprise a movable conventional iris for achieving said aperture gate and being adapted to be adjusted into different positions in said aperture plane, which is advantageous in that the position and size of the aperture gate may be adjusted in a simple and reliable manner.

According to another embodiment of the invention, said aperture unit may comprise a digital micro mirror device adapted to selectively direct light through said lens assembly in a first position in said aperture plane and to selectively direct light through said lens assembly in a second position in said aperture plane. By utilizing a micro mirror device, similar advantages may be realized as discussed above in conjunction with the liquid crystal element.

According to another aspect of the invention, there is provided a camera comprising a lens assembly of the type discussed above and a processing unit arranged to perform the method discussed above. The camera comprising the lens assembly and the processing unit is consequently capable of carrying out the method discussed above, and may consequently be used to produce output images having a reduced stray light content.

The wording processing unit is to be interpreted broadly as to mean any type of processor or logical unit being able to process data in any form.

According to another aspect of the invention, there is provided a system comprising a camera comprising a lens assembly of the type discussed above. The system further comprises a processing unit arranged to perform the method discussed above.

The system comprising the camera, comprising the lens assembly, and the processing unit is consequently capable of carrying out the method discussed above, and may consequently be used to produce output images having a reduced stray light content.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The aspects of the invention, including its particular features and advantages, will be readily understood from the following detailed description and the accompanying drawings, in which.

DETAILED DESCRIPTION

Figure 1:
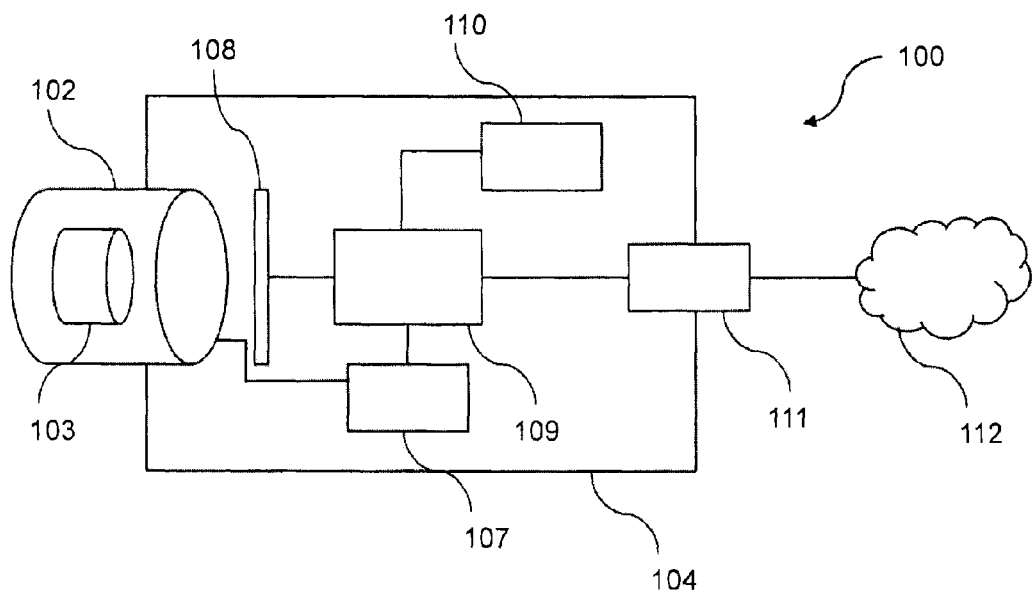
FIG. 1 is a schematic view of a digital video camera employed with a lens assembly according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Referring now to the drawings and to FIG. 1 in particular, there is conceptually depicted a digital video camera 100 employed with a lens assembly 102 according to an embodiment of the invention. The lens assembly 102 is equipped with an aperture unit 103. The digital video camera 100 includes a focusing function, i.e. the focus of the digital video camera 100 may be varied to focus on objects on different distances from the camera. Moreover, the digital video camera 100 may be connectable to a digital network 112. Further, the digital video camera 100 may be a portable camera, a stationary camera or a camera having pan/tilt functionality. The digital video camera 100 may be a camera for monitoring applications, such as surveillance purposes, machine vision, store compliance, business information acquiring purposes, etc. In order to facilitate and simplify the understanding of the invention, exemplifying embodiments when the invention is used in conjunction with a digital video camera 100, are presented below. To further simplify, standard features of a digital video camera not being relevant for the present invention are not described hereinafter.

The digital video camera 100 comprises a housing 104. Further, the camera 100 comprises a controller 107, a photo sensor 108, a processing unit or processor 109, a memory 110 and an I/O-port 111.

The I/O-port 111 is according to the shown embodiment used to connect the digital video camera 100 to a communication network 112. The digital video camera 100 may however also be connected directly to a monitor (not shown) to show images or to a recorder (not shown) comprising a storage media for saving images. The communication network 112 may be any kind of communication network for communicating digital information, such as a wire line or wireless data communication network, e.g. a local area network (LAN) or a wireless local area network (W-LAN) or a Wide Area Network (WAN).

The photo sensor 108 is according to the shown embodiment arranged to acquire images of a scene. The photo sensor 108 may for example be a Charge Coupled Device (CCD) sensor, a Complementary Metal Oxide Semiconductor (CMOS) sensor, or similar, for registering incident light. The photo sensor 108 comprises a plurality of sensor pixels. The pixel level or data of each sensor pixel is a function of the number of photons received by said sensor pixel for various predetermined wavelengths.

Figure 2A:
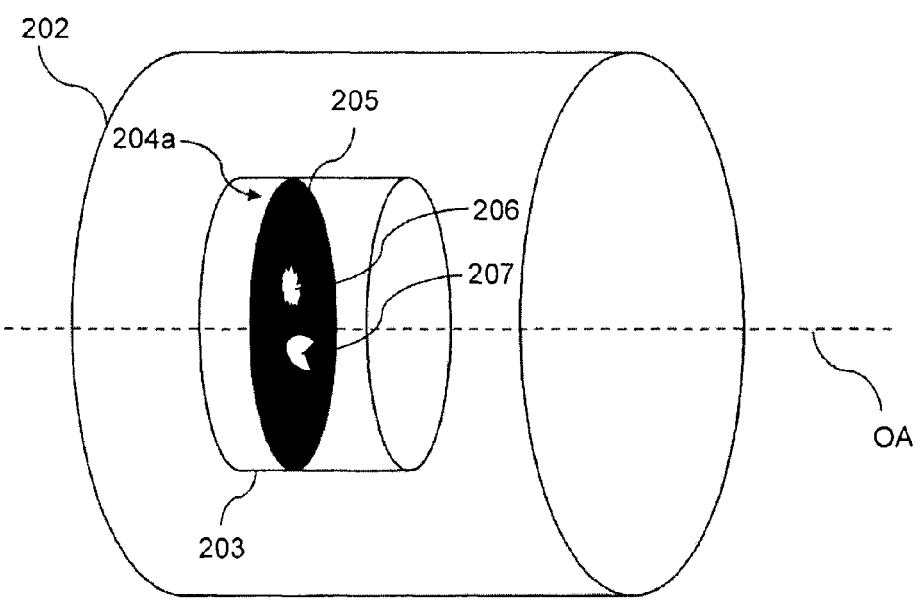
FIG. 2a is a schematic view of a lens assembly according to an embodiment of the invention, where a first aperture gate setting is used.
Figure 2B:
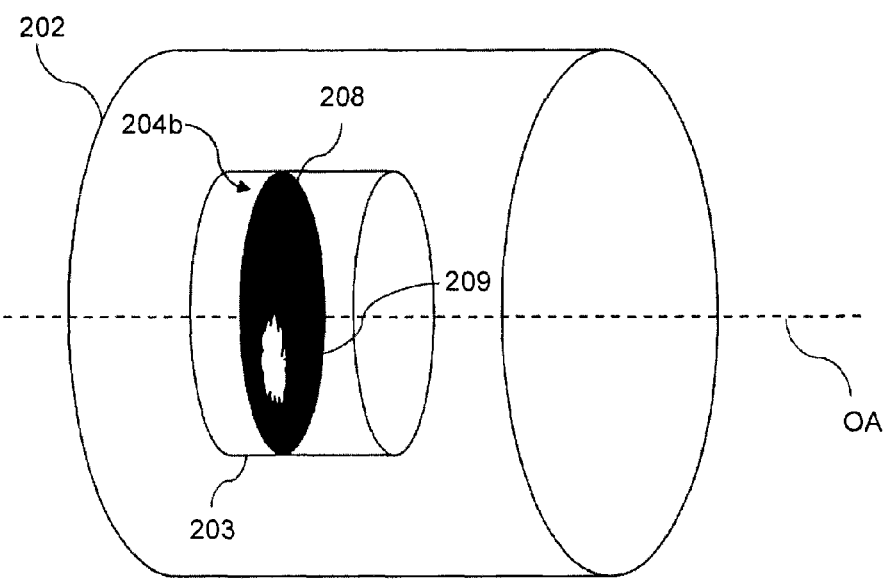
FIG. 2b is a schematic view of a lens assembly according to an embodiment of the invention, where a second different aperture gate setting is used.

Now referring to FIGS. 2a and 2b, here is conceptually depicted a lens assembly 202 according to an embodiment of the present invention. The lens assembly comprises an aperture unit 203, which in turn comprises an aperture gate 204a, 204b.

The aperture gate 204a, 204b is arranged in a plane which is orthogonal to the optical axis OA of the lens assembly 202. In this particular embodiment of the inventive lens assembly 202 the aperture gate 204a, 204b of the aperture unit 203 is arranged in the aperture plane of the lens assembly 202. This means in practice that for this particular lens assembly 202 the aperture plane is defined by the optical components of the lens assembly 202. In other embodiments of the invention the aperture gate 204a, 204b may be positioned in a plane not coinciding with the aperture plane. In other embodiments according to the invention, the lens assembly may be constructed such that the aperture plane is situated outside the optical components of the lens assembly 102, 202 along the optical axis OA.

Now referring to FIGS. 1, 2a, and 2b, the aperture unit 103, 203 of the lens assembly 102, 202 may comprise a controller (not shown) for controlling the position, size and/or shape of the aperture gate or may be connected to the controller 107 of the camera. By connecting the aperture unit 103, 203 to the controller 107, the aperture gate 204a, 204b may be controlled by the controller 107. The signal for adapting the aperture gate may originate from several different sources. For instance, the signal may be user induced or generated in the processing unit 109 based on a predetermined algorithm, the signal may also be sent from a remote location via the communication network 112.

In the depicted embodiment of the lens assembly 102, 202, the aperture unit 103, 203 comprises a liquid crystal element. The liquid crystal element of the aperture unit 203 is used to realize the aperture gate 204a, 204b. The liquid crystal element is divided into pixels which when deactivated are transparent and when activated become dark and thus light blocking. The activation is generally made by applying a current to the selected pixels that are to be activated. The controller of the aperture gate or the controller 107 of the camera may be configured to activate the selected pixels of the liquid crystal element. By activating selected pixels the appearance, and consequently the setting, of the aperture gate 204a, 204b may be controlled.

The depicted aperture unit 203 in FIG. 2a includes a light blocking region 205 blocking incident light entering the lens assembly 202, and two transparent regions 206, 207, defining the aperture gate 204a, arranged in different positions in relation to the optical axis OA of the lens assembly. The two regions 206, 207 defining the aperture gate 204a are of different shapes and do also have different sizes. Further, the regions 206, 207 are differently positioned in the aperture plane of the lens assembly 202.

The light blocking region 205 is realized by activating pixels of the liquid crystal element of the aperture unit 203 corresponding to the light blocking region 205.

The skilled person will realize that the aperture gate 204a, 204b may be adapted to present very different appearances. For instance, the single transparent region 209 defining the aperture gate 204b may be realized using the above presented solution, as depicted in FIG. 2b. The aperture unit 203 as depicted in FIG. 2b includes a light blocking region 208 and a transparent region 209 defining the aperture gate 204b. The transparent region 209 having a different position, shape and size, as compared to the transparent regions 206, 207 of FIG. 2a.

Similarly, several transparent or light blocking regions may be realized by controlling the pixels of the liquid crystal element of the aperture unit 203.

The skilled person realizes that several other solutions for realizing the aperture gate 204a, 204b of the aperture unit 203 may be used without departing from the scope of the present invention.

One way to realize an aperture gate 204a, 204b is to use a micro mirror device, such as a DMD or DLP. By using a micro mirror device, light entering the lens assembly 202 may be directed through the lens assembly 202 or directed in a different direction where the light does not pass through the lens assembly 202. As a micro mirror device comprises a plurality of controllable mirrors or reflective elements, the light being directed through the lens assembly 202 may be controlled. When using a micro mirror device, the appearance, and consequently the setting, of the aperture gate 204a, 204b may be controlled similarly as described above when the liquid crystal element is used to realize the aperture gate 204a, 204b. In other words, depending on the resolution of the micro mirror device, the position, shape and size of the aperture gate 204a, 204b may be controlled resulting in unique combinations of positions, shapes and sizes. Also in this case the aperture gate may comprise several isolated regions defining the aperture gate 204a, 204b by contributing to the light passing through the lens assembly 202.

Yet another way to realize the aperture gate is to use a rotating disk provided with a plurality of openings having different properties. The rotating disk may then e.g. be arranged in the aperture plane of the lens assembly 202. By rotating the disk in the aperture plane, the different openings of the rotating disk may then be introduced into the ray path of the lens assembly 202, thus defining the aperture gate 204a, 204b. By providing different openings having different properties, the appearance, and consequently the setting, of the aperture gate 204a, 204b may be adapted. The skilled person will realize that several properties of the aperture gate 204a, 204b may be controlled by designing a disk comprising a plurality of openings arranged such that they, when introduced into the ray path of the lens assembly 202 determines the appearance of the aperture gate 204a, 204b. For instance, the rotating disk may be provided with different openings corresponding to different positions, shapes and sizes of the aperture gate 204a, 204b.

Still another way to realize the aperture gate 204a, 204b may be to include a movable conventional iris into the aperture unit 203. In this case, the aperture gate 204a, 204b may be defined by the aperture of the iris. The iris may then be so arranged that it is movable in the aperture plane of the lens assembly 202. By moving the iris in the aperture plane, different positions of the aperture gate 204a, 204b may be realized. Additionally, by adjusting the metal plates of the iris, the size and shape of the aperture of the iris may be controlled. Consequently, the position the size and the shape of the aperture gate 204a, 204b may be controlled by using a movable conventional iris.

According to the present invention the processing unit (109) may be located remote from the camera (100). In this case the camera is connected to the processing unit (109) meaning that the processing unit may be used to process image data and the like originating from the camera. In other words, the invention may be embodied as a system comprising a camera and a processing unit. This will be discussed more in detail below.

In the following an embodiment of a method 300 according to the present invention for reducing stray light will be schematically described, with reference to FIG. 3, which shows exemplifying steps of the method. The following non limiting examples of embodiments of an inventive method will for simplifying reasons be described when used in conjunction with a digital video camera 100 according to above.

In a first step 301 of the method a camera 100 comprising a lens assembly 102, 202 is provided. The camera 100 may as discussed above be of several different kinds.

In a second step 302 of the method, the lens assembly is provided with an aperture unit 103, 203 having an aperture gate in an aperture plane being orthogonal to the optical axis OA of the lens assembly 102, 202. The aperture gate 204a, 204b being adjustable in the aperture plane.

In a third step 303 of the method, a plurality of images of a scene is acquired with the camera 100 using an unique aperture gate setting for each image. The unique aperture gate setting corresponding to a unique combination of a position, a size and a shape of said aperture gate.

In a fourth step 305 of the method, the acquired images are analyzed for generating data pertaining to a difference in stray light content.

In a fifth step 306 of the method, an output image is produced based on the generated data pertaining to a difference in stray light content.

In the second step 302, when providing the aperture unit 203 comprising the aperture gate 204a, 204b, several different solutions for realizing the aperture gate 204a, 204b may be used without departing from the scope of the invention, as discussed above.

In the third step 303 of the method a plurality of images of a scene are acquired using the camera 100. The images are acquired using unique aperture gate settings, which correspond to unique combinations of position, size and shape of the aperture gate 204a, 204b in the aperture plane. An unique combination is used for each acquired image.

By acquiring images of the same scene using different aperture gate settings, images having different content due to stray light as discussed above may be obtained, although representing the same scene.

According to the inventive method a plurality of images may be acquired however, only two images may be used without departing from the inventive concept. The following description is for reasons of simplicity partly based on the special case where two images are acquired of the same scene and processed in accordance with the inventive method. The skilled person will realize that the method and its different embodiments may be used when acquiring any number of images greater than one. For instance, three, four, eight or even 60 images may be acquired using different aperture gate settings, for producing an output image. The digital video camera 100 may be capable of acquiring images at a higher frame rate than what is actually used in the outputted video stream of the camera 100. By being able to capture images at a higher frame rate than the outputted video stream, the camera may capture several images of the same scene, which images then may be used according to the inventive method. If for instance the camera is outputting a video stream of 25 images or frames per second and is capable of capturing 100 frames per second, then four captured images may be used in the inventive method to generate one single output image.

Correspondingly, a video camera 100 being operated at an even higher frame rate may use even more images according to the inventive method.

A slightly different version of the inventive method may be used in case the camera 100 used is not capable of acquiring more images than what is required in the outputted image stream. In this case all images are outputted and the aperture gate setting is altered for the outputted images. By doing this a majority of the images acquired may have a reduced stray light content, although other images may have a higher stray light content as a result of a less optimal aperture gate setting. In practice, at least two different aperture gate settings are used and the one found to be the best, i.e. resulting in the lowest stray light content, is then used for the outputted images for a certain period of time. After a while a new iteration aiming to find a new aperture gate setting may be carried out by acquiring at least two images with different aperture gate settings. The time period may be predetermined or may vary depending on e.g. the captured scene. The method 300 may also be used iteratively when used with a camera 100 capable of acquiring more images than what is outputted. This particular case will be discussed more in detail below. When the images are acquired by the camera 100, image data representing the acquired images may be temporarily stored in the memory 110 of the camera for being easily accessed later on.

In the fourth step 305, the images acquired by the camera 100 are analyzed for generating data pertaining to a difference in stray light content. When analyzing the acquired images several different analyzes may be used to generate the data, as discussed above in the summary section, which will be further substantiated below.

According to a currently preferred embodiment of the inventive method 300, the fourth step 305 includes dividing the acquired images into a plurality of corresponding pixel groups of neighboring pixels. As discussed above the size of the pixel groups are preferably selected such that the influence of noise is counteracted. For instance a 5×5 pixel area, comprising of 25 pixels may be selected as a pixel group. Corresponding pixel groups are selected in the acquired images and a mean value of the pixel levels of the pixel groups may then be calculated. In this particular example, the mean value of the pixel levels for the 25 pixels of each pixel group is calculated. The calculated mean value is then used to generate the data pertaining to a difference in stray light content. The data may as discussed above be represented in several ways.

According to another currently preferred embodiment of the inventive method 300, the fourth step 305 includes dividing the acquired images into a plurality of corresponding pixel groups of neighboring pixels as discussed above. For each pixel group a contrast value is then calculated. As stated above, in this particular case, each pixel group must comprise at least two pixels, as no contrast value can be defined for a single isolated pixel. When calculating the contrast value for each pixel group the highest pixel level, a, and the lowest pixel level, b, of the pixel group is determined. Following this the ratio $(a-b)/(a+b)$ is calculated. By calculating the ratio any scaling effect may be removed as a and b are scaled by the same factor, meaning that the calculated ratio remains unaffected by any scaling effects. In the following the results of the contrast value calculation is used to generate the data pertaining to a difference in stray light content. The data may as discussed above be represented in several ways.

Further, it is possible to identify stray light by calculating a mean pixel level and/or a contrast value for pixels comprised in the corresponding pixel groups and thereafter to compare the calculated mean pixel levels and/or contrast values for identifying stray light in the acquired images.

The skilled person realizes that various analyzes other than those exemplified may be made without departing from the scope of the invention. For instance the a statistical correlation value may be calculated and used when generating the data pertaining to a difference in stray light content. Further, the skilled person realizes that also other available statistical methods may be advantageously used when generating the data. When the inventive method is used in conjunction with a digital video camera 100 as discussed above, the calculations concerning the analyzes may preferably be carried out by means of the processor 109 of the camera 100.

However, analyzes of the acquired images may be performed by a processor or analyze unit separated from the camera. In this case image data as acquired by the camera is fed from the camera to the separate processor or analyze unit via the I/O port 111 using the communication network 112. In other words the invention may be embodied as a camera comprising an inventive lens assembly as well as a processing unit or as a system comprising a camera, comprising an inventive lens assembly, and a processing unit, as discussed above.

In the fifth step 306 an output image is produced based on the data pertaining to a difference in stray light content. The output image may be generated in several different ways. A few non limiting examples on how to produce the output image will follow below, where currently preferred embodiments of the inventive method are disclosed. In general, when the method is used in conjunction with the camera 100 the processor 109 may be used to generate the output image, based on the data pertaining to a difference in stray light content and the image data may be temporarily stored in the memory 110. The output image being produced may then be fed to the network 112 by means of the I/O port 111 of the camera 100. The output image may as discussed above be part of a video stream or may be a still picture.

The inventive method 300 may also be repeated sequentially in order to iteratively determine an aperture gate setting which may be adapted to a specific scene. By repeating the method 300 sequentially and adapting the aperture gate setting based on a previous setting resulting in an image having a reduced stray light content, the aperture gate setting may be further adapted to the scene being captured, in the sense that images having a reduced stray light content may be acquired. The sequential repetition of the method 300 in order to determine a more favorable aperture gate setting may advantageously be used when a static scene or a scene with limited alternations are captured or recorded. By iteratively repeating the method 300, a specific aperture gate setting adapted to a specific scene may be determined. The aperture gate setting may then be updated at regular intervals using the method 300. Even in case a static scene is captured there might still be a need to adjust the aperture gate setting as e.g. the light conditions of the scene are changed.

Another approach is to use the inventive method 300 to determine an aperture gate setting which is considered appropriate for a specific scene, and then use the determined aperture gate setting subsequently. The skilled person will realize that the inventive method 300 may be used to determine an appropriate aperture gate setting for a specific scene, using a camera 100 employed with an inventive lens assembly 102, 202. Following this a camera having a fixed aperture gate setting based on the result as acquired by the inventive method 300 may be used to acquire images having a reduced stray light content of the specific scene.

In an embodiment of the inventive method 300 the producing 306 comprises determining and creating a merged aperture gate setting. The merged aperture gate setting combining at least two aperture gate settings used during the image acquiring step 303. After having determined and created the merged aperture gate setting, the merged aperture gate setting is used to acquire an output image. The merged aperture gate setting is created by combining two or more of the aperture gate settings used during the image acquiring step 303.

By analyzing the data pertaining to a difference in stray light content conclusions regarding favorable or unfavorable aperture gate settings may be drawn, why favorable settings may be determined and selected. For instance, some unique aperture gate settings may result in images with an increased amount of stray light while other unique aperture gate settings may result in images with a reduced or lower amount of stray light. By selecting and combing two or more unique aperture gate settings, considered as e.g. favorable, to form a merged aperture gate setting an improved image may be acquired and used as an output image.

For instance, when using a liquid crystal element the merged output aperture gate setting may include all the transparent portions of the unique aperture gate settings corresponding to images from the image acquiring step 303 having a low level of stray light.

In an embodiment of the inventive method 300, the fifth step 306 further comprises selecting one of the, in the previous steps of the method, acquired images and using the selected image as output image. In this particular embodiment of the method 300 one of the acquired images are selected based on the previously generated data pertaining to a difference in stray light content. Based on the data it may be concluded which image has the lowest stray light content or a low stray light content. This may in practice be the image having the lowest pixel levels, light intensity or highest contrast as discussed above. The skilled person realizes that several different strategies for selecting an image may be used without departing from the scope of the invention. The selection is of course not limited to the image having the lowest stray light content. Consequently, any image may be selected based on the previously generated data pertaining to a difference in stray light content.

Figure 3:
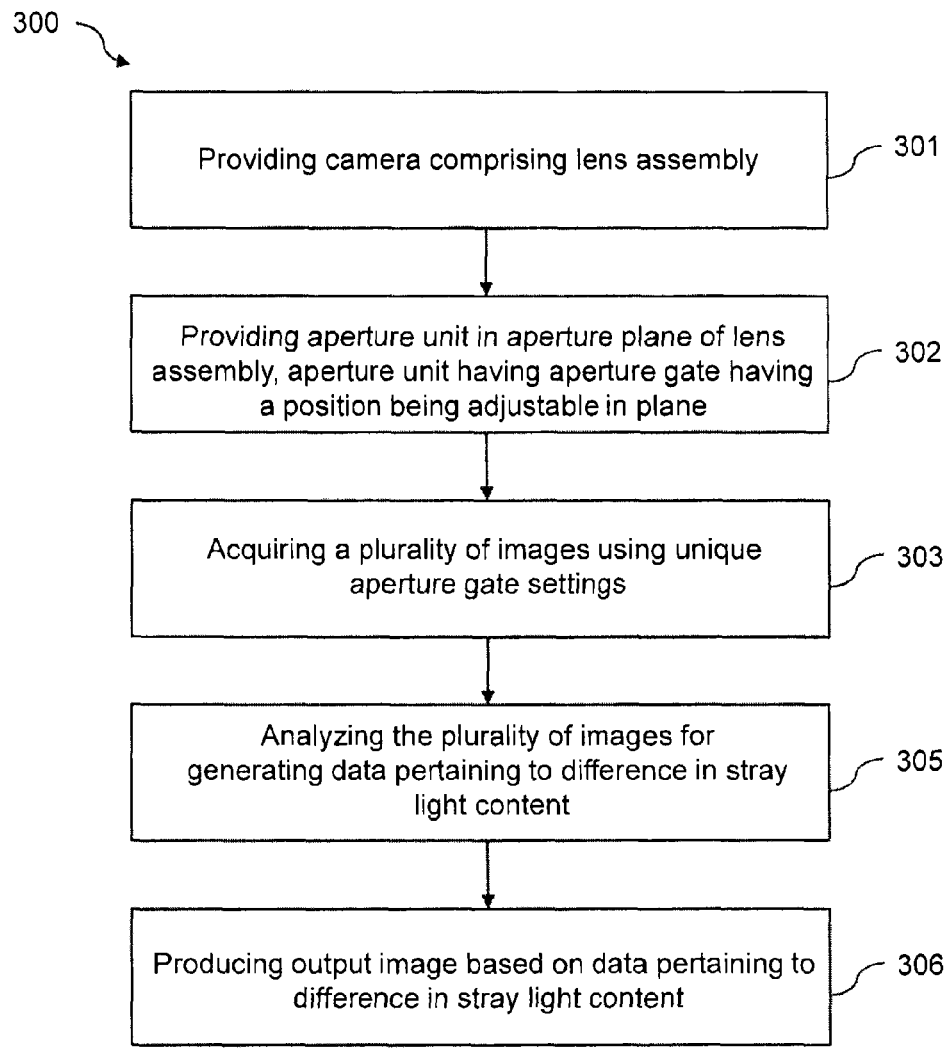
FIG. 3 is a schematic flow chart, showing a method according to an embodiment of the invention.
Figure 4:
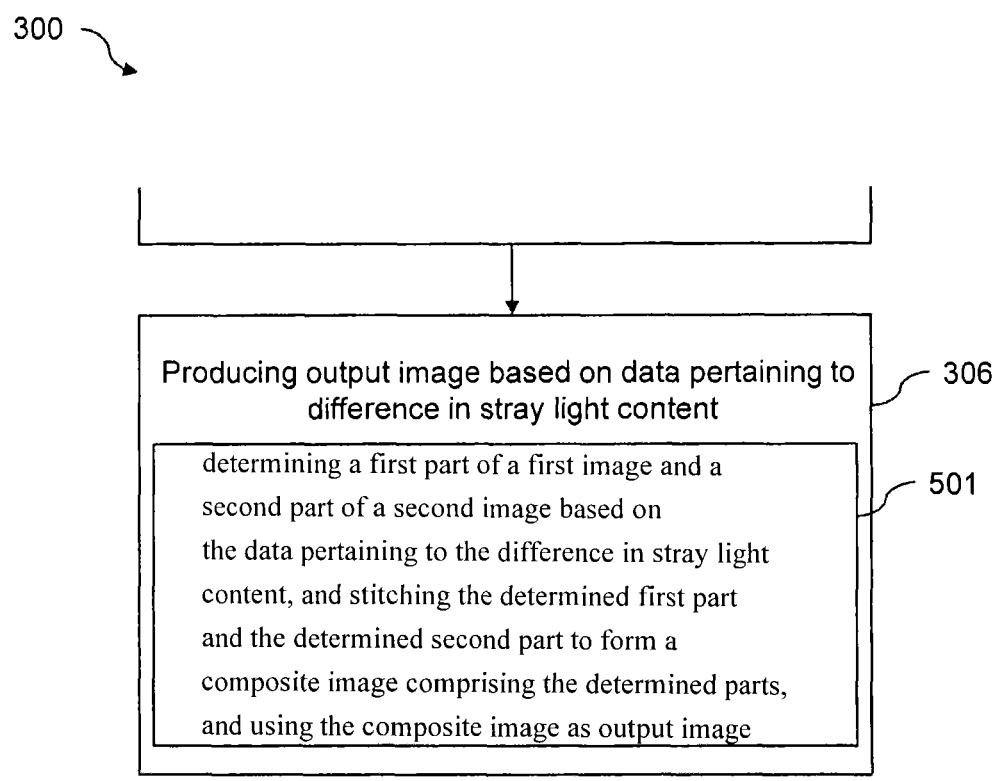
FIG. 4 is a schematic partial flow chart, showing a part of a method according to an embodiment of the invention.

An embodiment of a method according to the present invention will be schematically described, with reference to FIG. 4, which is a partial expanded view of FIG. 3. In FIG. 4 the fifth 306 method step is shown exhibiting additional features 501 of the step 306 performed.

In the fifth step 306 of the method according to this particular currently preferred embodiment, the acquired images may be divided into parts, regions or portions. When the images are divided into parts several strategies may be used. For instance, the images may be divided into parts using a simple matrix or mesh which gathers the previously determined pixel groups of the acquired images into image parts based on the locations of the pixel groups in the acquired images or based on the data pertaining to a difference in stray light content. Another strategy that may be used is to, based on the content of the image in question, determine dynamic parts, not being equal for all captured scenes. This may be done by analyzing the previously generated data pertaining to the difference in stray light content of the images. The images acquired are then preferably divided in the same way, i.e. all acquired images are divided in the same way, which facilitates the application of the method.

Following, it is determined which part of the corresponding parts from the acquired images has the lower stray light content, based on the previously generated data pertaining to the difference in stray light content. As discussed above the lower stray light content may for instance be determined by calculating a mean pixel level for the pixel groups or a contrast value for the pixel groups. In practice, as discussed above, the part of the corresponding parts having the lowest mean pixel level or the highest contrast value is generally the part having the lowest stray light content.

Following, the determined parts having a lower stray light content are stitched together to form an output image. In other words, for each part of the output image a part is selected from one of the acquired images, and the selected parts are merged to form a complete image of the scene. This means in practice that the output image may comprise parts originating from several acquired images of the scene. By producing a type of stitched image based on several images of the same scene, an output image having a reduced stray light content may be produced.

The dividing of the images into parts, the determining of parts having a lower stray light content and stitching of the determined parts may be performed by the processor 109 of the camera 100 when the method is used in conjunction with a digital video camera 100. As discussed before the output image may be fed to the network 112 using the I/O port 111 of the camera.

Figure 5:
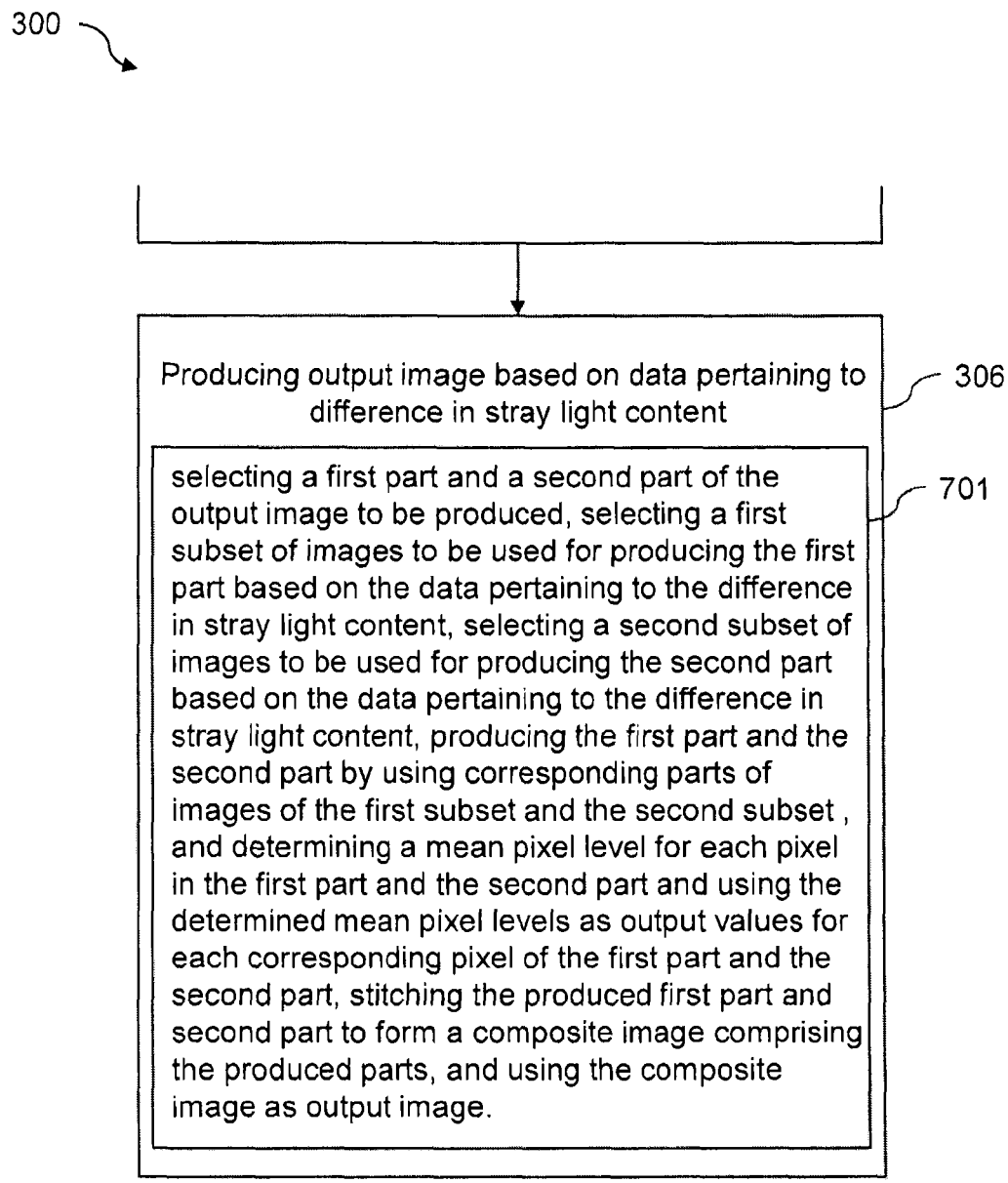
FIG. 5 is a schematic partial flow chart, showing a part of a method according to an embodiment of the invention.

An embodiment of a method according to the present invention will be schematically described, with reference to FIG. 5, which is a partial expanded view of FIG. 3. In FIG. 5 the fifth 306 method step is shown exhibiting additional features 701 of the step 306 performed.

Additionally in the fifth 306 method step a first part and a second part of the output image to be produced are selected. As discussed above the parts may be selected in various ways, for instance the parts may be selected using a simple mesh to divide the previously generated pixel groups into parts or the parts may be based on the previously generated data pertaining to a difference in stray light content. Further, a part may comprise a single pixel group or a part may be selected based on the scene being captured. In the following a first subset of images of the acquired plurality of images to be used for producing a first part of the output image is selected based on the data pertaining to the difference in stray light content. The images of the first subset may be selected based on several conditions. According to one embodiment, the images are selected based on the data pertaining to a difference in stray light content, and images determined to have an estimated level of stray light below a certain amount is selected for the first part. Similarly images for the first subset may be selected using other strategies. For instance, a fixed number of images determined to have the lowest stray light content may be selected or a fixed number of images determined to have the highest stray light content may be discarded and consequently not used in the first subset. By selecting images having a low level of stray light for a specific part, a first subset suitable for producing a part of the output image may be selected.

Analogously, a second subset suitable for producing a second part of the output image may be selected.

The skilled person realizes that the images used for the respective subsets may be selected using various strategies based on the data pertaining to a difference in stray light content without departing from the inventive concept.

Further, the skilled person realizes that any number of parts and subsets may be used without departing from the inventive concept.

In the following a first part of the output image is produced by using corresponding parts of the images of the first subset, and determining a mean value of the pixel levels for each corresponding pixel of the first part and using the determined mean value as output value for each corresponding pixel of the first part. By doing this the SNR of each pixel of the first part may be improved. Consequently, by selecting an appropriate subset of images and determining a mean value for each pixel, the output image may be further improved.

To form the output image, all determined parts are produced as described above in conjunction with the first part. As discussed above any number of parts may be used without departing from the scope of the invention. The parts so produced are then stitched together to form a composite output image comprising the previously produced parts.

The operations of determining data pertaining to a difference in stray light content may be done by the processor 109 of the camera 100, when the method is used in conjunction with the camera 100. Also the producing may be done by the processor 109 of the camera 100. The output image being produced may then be fed to the network 112 by means of the I/O port 111 of the camera.

As described above, the images of the respective subsets may be selected in different ways, without departing from the scope of the invention.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Additionally, even though the invention has been described with reference to a few specific exemplifying embodiments thereof, many different alterations, modifications and the like will become apparent for the skilled person. Variations to the disclosed embodiments may be understood and effected by the skilled person in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for identifying stray light in a plurality of images of a scene using a camera comprising an image sensor, and a lens assembly comprising a lens for focusing light onto the image sensor, an aperture unit having an aperture gate arranged in an aperture plane, said aperture gate having a position, a shape and/or a size being adjustable in said aperture plane by using said aperture unit, said method comprising:
    acquiring, by using said camera, the plurality of images of said scene, wherein each image of said plurality of images is acquired using an unique aperture gate setting within said plurality of images, wherein said unique aperture gate setting corresponds to a unique combination of the position, the shape and/or the size of said aperture gate in said aperture plane,
    dividing each of said plurality of images into corresponding pixel groups,
    calculating a mean pixel level or a contrast value pixels comprised in said corresponding pixel groups of each of said plurality of images, and
    comparing calculated mean pixel levels or contrast values for identifying stray light in said plurality of images.

2. A method for producing an producing an output image of a scene based on an identification of stray light in a plurality of images of the scene
    using a camera comprising an image sensor, and a lens assembly comprising a lens for focusing light onto the image sensor, an aperture unit having an aperture gate arranged in an aperture plane, said aperture gate having a position, a shape and/or a size being adjustable in said aperture plane by using said aperture unit, said method comprising:
    acquiring, by using said camera, a plurality of images of said scene, wherein each image of said plurality of images is acquired using an unique aperture gate setting within said plurality of images, wherein said unique aperture gate setting corresponds to a unique combination of the position, the shape and/or the size of said aperture gate in said aperture plane,
    dividing each of said plurality of images into corresponding pixel groups,
    calculating a mean pixel level or a contrast value for pixels comprised in said corresponding pixel groups of each of said plurality of images, and
    comparing calculated mean pixel levels or contrast values for identifying stray light in said plurality of images,
    generating, as a result of said comparing, data pertaining to a difference in stray light content within corresponding pixel groups, and
    producing said output image based on said data pertaining to the difference in the stray light content.

3. The method according to claim 2, wherein said producing further comprises:
    selecting one of a plurality of unique aperture gate settings based on said data pertaining to the difference in the stray light content,
    using said selected unique aperture gate setting to acquire an additional image, and
    using said additional image as said output image.

4. The method according to claim 2, wherein said producing further comprises:
    for each corresponding pixel group, selecting among the plurality of images, one of a plurality of unique aperture gate settings, by determining, based on said data pertaining to the difference in the stray light content, for which of said acquired images said mean pixel level is lowest or for which of said acquired images said contrast value is highest,
    creating a merged aperture gate setting based on said selected aperture gate setting, by combining at least two of said selected aperture gate setting used in said acquiring,
    using said merged aperture gate setting to acquire an additional image, and
    using said additional image as said output image.

5. The method according to claim 2, wherein said producing further comprises:
    selecting one of said plurality of images based on said data pertaining to the difference in the stray light content, and
    using said selected image as said output image.

6. A camera comprising:
    an image sensor, and
    a lens assembly comprising:
        a lens for focusing light onto the image sensor,
        an aperture unit having an aperture gate arranged in an aperture plane, said aperture gate having a position, a shape and/or a size being adjustable in said aperture plane by using said aperture unit, and
        a processing unit arranged to:
            acquire, by using said camera, a plurality of images scene, wherein, each image of said plurality of images is acquired using an unique aperture gate setting within said plurality of images, wherein said unique aperture gate setting corresponds to a unique combination of the position, the shape and/or the size of said aperture gate in said aperture plane,
            divide each of said ality of images into corresponding pixelgroups,
            calculate a mean pixe evel or a contrast value for pixels comprised in said corresponding pixel groups of each of said plurality of images, and
            compare calculated mean pixel levels or contrast values for identifying stray light in said plurality of images.

7. A camera comprising:
    an image sensor, and
    a lens assembly comprising:
        a lens for focusing light onto the image sensor,
        an aperture unit having an aperture gate arranged in an aperture plane, said aperture gate having a positi , a shape and/or a size being adjustable in said aperture plane by using said aperture unit, and a processing unit arranged to:

acquire, by using said camera, a plurality of images of a scene, wherein each image of said plurality of images is acquired using an unique aperture gate setting within said plurality of images, wherein said unique aperture gate setting corresponds to a unique combination of the position, the shape and/or the size of said aperture gate in said aperture plane, divide each of said plurality of images into corresponding pixel groups, calculate a mean pixel level or a contrast value for pixels comprised in said corresponding pixel groups of each of said plurality of images, and compare calculated mean pixel levels or contrast values for identifying stray light in said plurality of images, generate, as a result of said comparing, data pertaining to a difference in stray light content within corresponding pixel groups, and produce an output image based on said data pertaining to the difference in the stray light content.

8. A system comprising:

a camera comprising:

an image sensor, and a lens assembly comprising:

a lens for focusing light onto the image sensor, an aperture unit having an aperture gate arranged in an aperture plane, said aperture gate having a position, a shape and/or a size being adjustable in said aperture plane by using said aperture unit, and a processing unit arranged to:

acquire, by using said camera a plurality of images of a scene, wherein each image of said plurality of images is acquired using an unique aperture gate setting within said plurality of images wherein said unique aperture gate setting corresponds to a unique combination of the position, the shape and/or the size of said aperture gate in said aperture plane, divide each of said plurality of images into corresponding pixel groups, calculate a mean pixel level or a contrast value for pixels comprised in said corresponding pixel groups of each of said plurality of images, and compare calculated mean pixel levels contrast values for identifying stray light in said plurality of images.

9. A system comprising:

a camera comprising:

an image sensor, and a lens assembly comprising:

a lens for focusing light onto the image sensor, an aperture unit having an aperture gate arranged in an aperture plane, said aperture gate having a position, a shape and/or a size being adjustable in said aperture plane by using said aperture unit, and a processing unit arranged to:

acquire, by using said camera, a plurality of images of a scene, wherein each image of said plurality of images is acquired using an unique aperture gate setting within said plurality of images, wherein said unique aperture gate setting corresponds to a unique combination of the position, the shape and/or the size of said aperture gate in said aperture plane, divide each of said plurality of images into corresponding pixel groups, calculate a mean pixel level or a contrast value for pixels comprised in said corresponding pixel groups of each of said plurality of images, and compare calculated mean pixel levels or contrast values for identifying stray light in said plurality of images, generate, as a result of said comparing, data pertaining to a difference in stray light content within corresponding pixel groups, and produce an output image based on said data pertaining to the difference in the stray light content.

\* \* \* \* \*